United States Patent [19]
Young

[11] Patent Number: 6,126,409
[45] Date of Patent: Oct. 3, 2000

[54] INTEGRAL HOUSING UNIT HAVING A LOCKDOWN CHECK VALVE AND A PRESSURE RELIEF VALVE FOR A SUBMERSIBLE PUMP AND METHOD OF ASSEMBLING THE SAME

[75] Inventor: David S. Young, Maquoketa, Iowa

[73] Assignee: Marley Pump, Davenport, Iowa

[21] Appl. No.: 09/285,890

[22] Filed: Apr. 7, 1999

[51] Int. Cl.[7] .................................................. F04B 49/00
[52] U.S. Cl. ......................... 417/297; 417/307; 251/82; 251/83
[58] Field of Search ............................... 417/423.3, 307, 417/305, 299; 251/83, 82

[56] References Cited

U.S. PATENT DOCUMENTS

| | | | |
|---|---|---|---|
| 1,177,019 | 3/1916 | Coll | 251/246 |
| 2,149,602 | 3/1939 | Horvath | 103/42 |
| 2,588,527 | 3/1952 | Holmes | 137/53 |
| 2,652,948 | 9/1953 | Moore et al. | 222/26 |
| 2,788,192 | 1/1957 | Mountford | 251/62 |
| 2,821,993 | 2/1958 | Pacey et al. | 137/194 |
| 2,840,119 | 6/1958 | Gavin | 141/21 |
| 2,952,389 | 9/1960 | Fowler et al. | 222/52 |
| 2,986,308 | 5/1961 | Pacey et al. | 222/333 |
| 3,010,470 | 11/1961 | Clymer | 137/144 |
| 3,114,391 | 12/1963 | Kurtz | 137/599.2 |
| 3,172,567 | 3/1965 | Deters et al. | 222/52 |
| 3,183,723 | 5/1965 | Deters | 73/40.5 |
| 3,197,085 | 7/1965 | Deters et al. | 222/333 |
| 3,592,224 | 7/1971 | Bois et al. | 137/492 |
| 3,910,102 | 10/1975 | McLean | 73/40.5 R |
| 3,940,020 | 2/1976 | McCrory et al. | 222/52 |
| 4,646,700 | 3/1987 | Tuckey | 123/50 |
| 5,007,614 | 4/1991 | Lockwood, Jr. | 251/83 |
| 5,143,115 | 9/1992 | Geyle, Jr. | 137/493 |

*Primary Examiner*—Charles G. Freay
*Assistant Examiner*—Timothy P Solak
*Attorney, Agent, or Firm*—Sughrue, Mion, Zinn, Macpeak & Seas, PLLC

[57] ABSTRACT

A manifold assembly includes a housing unit which has a check valve assembly and a pressure relief valve assembly formed in one integral unit. When the check valve is in a closed position, the dispensing line is sealed off from the pumping assembly. In addition, the check valve also seals off the pressure relief outlet in the same movement, by the use of two O-rings placed on a lockdown member. Line maintenance tests may be performed accurately, as well as testing of the pumping assembly, when the check valve and pressure relief valve are closed. This structure provides an improved assembly since the check valve and pressure relief valve are formed in one integral unit so as to be adjacent one another so that both valves can be conveniently closed off at the same time during a maintenance check.

14 Claims, 10 Drawing Sheets

INTEGRAL HOUSING UNIT HAVING A LOCKDOWN CHECK VALVE AND A PRESSURE RELIEF VALVE FOR A SUBMERSIBLE PUMP AND METHOD OF ASSEMBLING THE SAME

BACKGROUND OF THE INVENTION

1. Field of the Invention

This invention generally relates to a submersible pump for pumping a fuel, such as petroleum, and to the pump manifold construction to which the outlet of the submersible pump is connected. In particular, the present invention relates to a housing unit combining a lockdown check valve assembly and a pressure relief valve assembly into one integral unit. This invention also relates to a method for assembling/disassembling the unit with respect to the outlet of the submersible pump.

2. Background of the Related Art

Conventional pumping systems are used for pumping a product, such as fuel, from an underground tank to a dispensing station aboveground. There are several problems associated with these systems, one problem relating to the inconvenience associated with having the pumping system located underground. For instance, annual maintenance checks must be conducted under local and federal laws, for leaks in the underground piping. These maintenance checks are required to prevent contamination of the soil with petroleum products. However, in conventional systems it is difficult to conduct these checks because the dispensing line must be cut off from the pumping line to get a seal within the dispensing line itself.

Under federal law, the dispensing lines must be checked for leaks on a regular basis, so as to prevent contamination to the soil near the underground pipes. In addition, prevention of leaks is desired from an economical point of view, since leaks are inefficient and costly. In order to obtain an accurate test of a dispensing line, the line must be sealed off, including the end located at the outlet end of the pumping assembly.

In addition, conventional pressure relief valves, such as the one disclosed in U.S. Pat. No. 2,149,602, regulate the pressure of delivery by the pump so that any excess over that pressure will be relieved by the relief valve by adjusting a screw plug. However, there is no feature for adjusting the pressure to be a predetermined amount. In addition, the pressure relief valve is remotely located from the check valve, which is inconvenient when mandatory leak checks must be made of the dispensing lines since this valve should be closed off at that time.

SUMMARY OF THE INVENTION

The present invention overcomes the above problems by combining a check valve assembly and a pressure relief valve assembly into one housing unit. The check valve assembly includes a lockdown member which serves multiple purposes during the line pressure maintenance operation. First, it assures that there is no leakage around the check valve, and second, it seals off an expansion relief port leading to the pressure relief valve assembly. Also, the check valve assembly of the present invention may be mounted on the manifold so as to be at a 45° angle from the mounting plane of the manifold to the tank. This arrangement provides optimum laminar flow while maintaining adequate check valve sealing characteristics.

In addition, the present invention provides an adjustable relief valve in which the relief pressure can be adjusted by turning an adjustment member. The pressure can be adjusted from approximately 0 to 50 psi as the adjustment member compresses a spring which is biased against a diaphragm.

With the above unit, an operator can check the pressure between the pump and the check valve in the manifold, as well as the dispensing line discussed above.

Furthermore, with the present invention, one convenient housing unit contains the lockdown screw check valve and the pressure relief valve. This convenient structure allows for easier assembly and convenience during maintenance operations.

In achieving the above objectives, a housing unit for use with a manifold is mounted on an outlet end of a submersible pump. The housing unit includes a check valve assembly having a check valve member and a pressure relief valve assembly. A lockdown member is located in the check valve assembly for closing off a dispensing line from the submersible pump. An adjustment member is fitted in an expansion relief body of the pressure relief valve assembly, for adjusting the relief pressure from approximately 0 to 50 psi. The check valve assembly is located at the outlet end of the pump for sealing off an expansion relief port of the pressure relief valve assembly and for sealing off the dispensing line to perform maintenance checks of the dispensing line.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
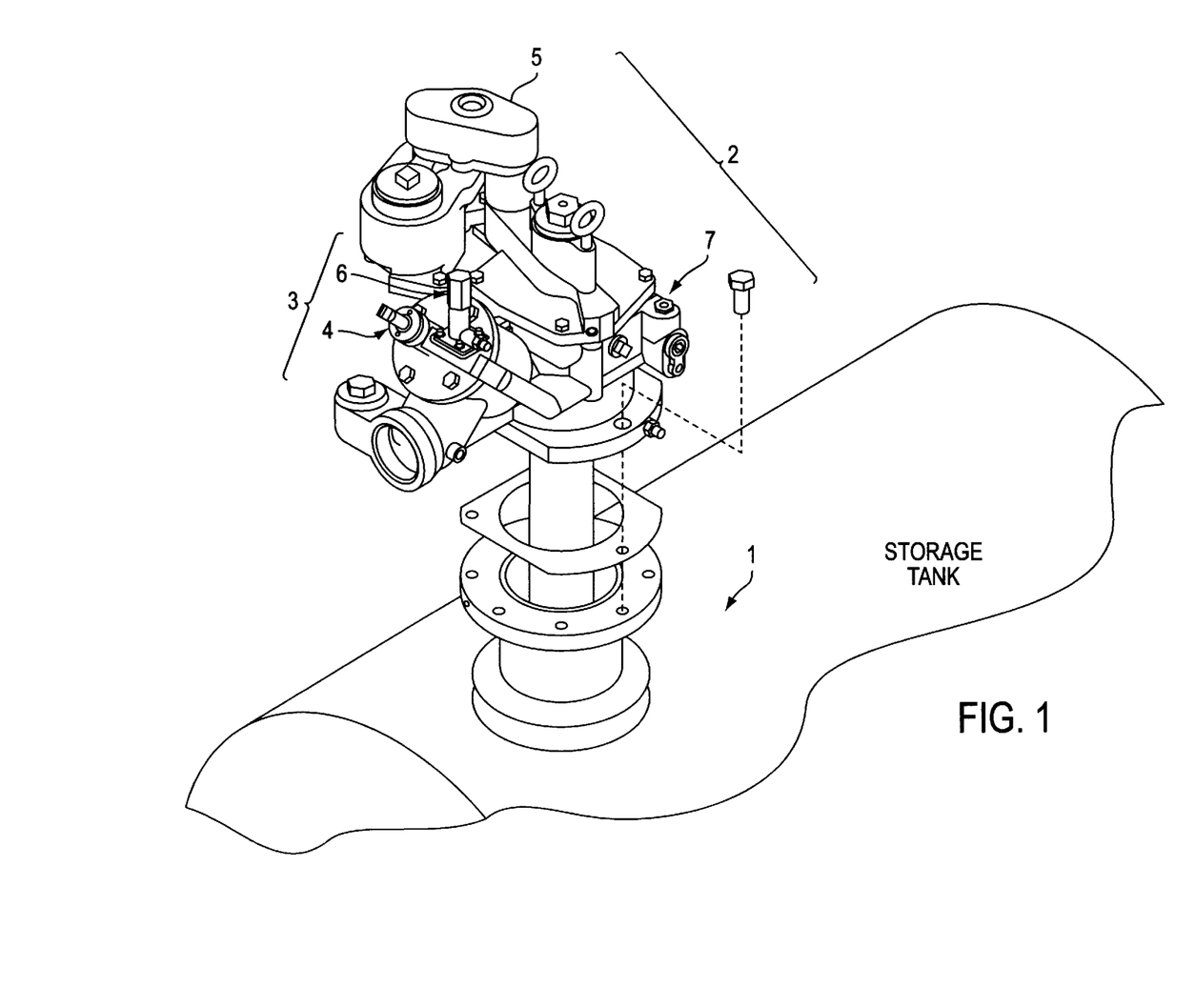
FIG. 1 is a perspective view of a manifold assembled on an outlet end of a submersible pump of a storage tank.

FIG. 1 shows a perspective view of the manifold of the present invention mounted on a submersible pump assembly 1. The manifold 2 includes a housing unit 3. The housing unit 3 has a check valve assembly 4 and a pressure relief valve assembly 6, so that the check valve and pressure relief valve assemblies are formed in a single, integral unit.

Figure 2:
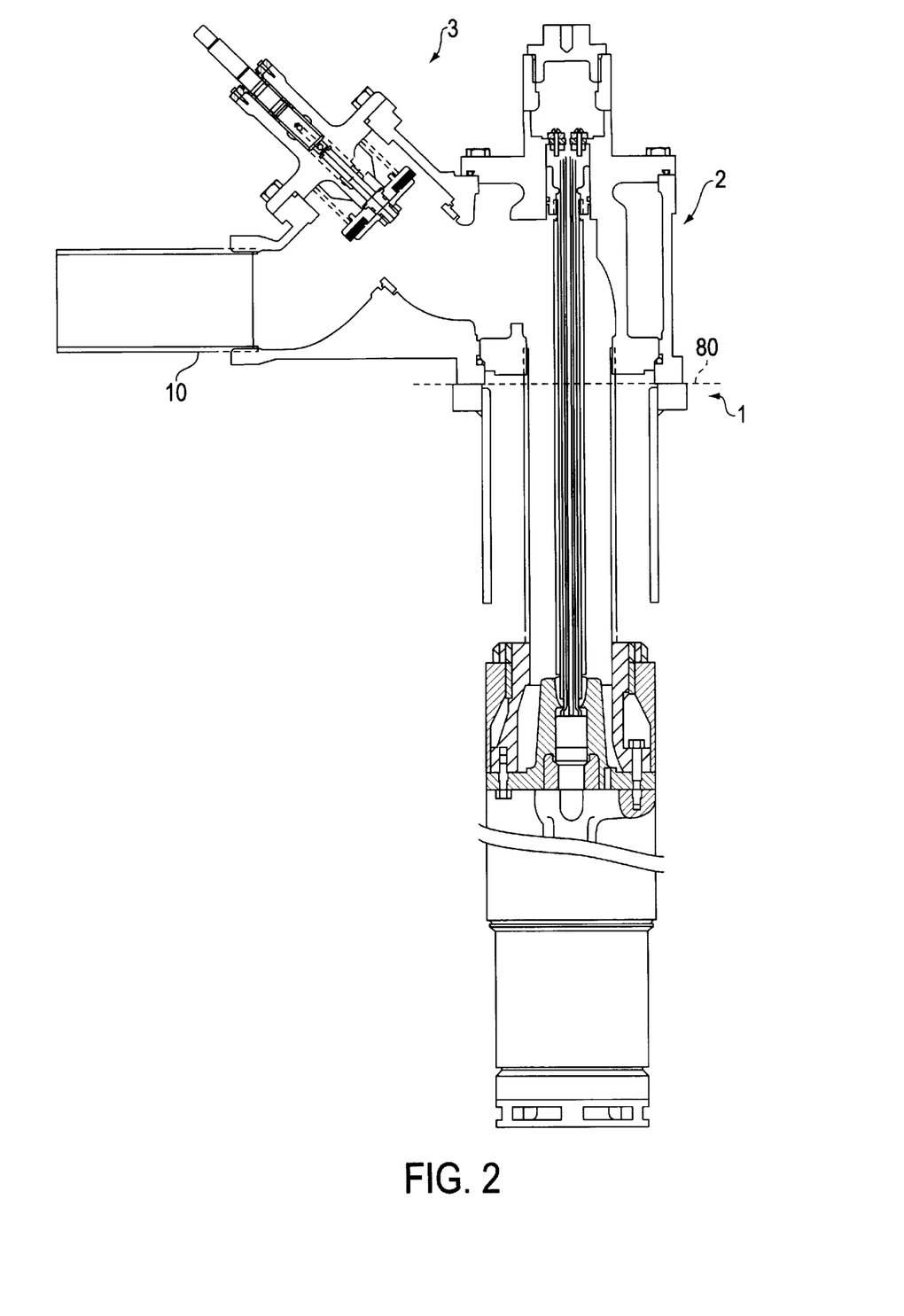
FIG. 2 is a sectional view of the manifold assembled on the pump.

Referring to FIG. 2, the manifold 2 constructed according to the present invention is shown, attached to a submersible pump assembly 1. The manifold assembly, also known as a header, is attached to the top of a tank port; the submersible pump 1 is suspended into the tank while attached to the manifold assembly. The housing unit 3 is mounted to the manifold 2 and is positioned so that the housing unit 3 is positioned at a 45° angle with respect to a mounting plane 80 at which the manifold 2 is mounted on the tank port.

The manifold 2 also includes a yoke assembly 5 and a stand alone siphon port 7, as most clearly shown in FIG. 1. The yoke assembly 5 is engaged or disengaged (shown engaged in this figure), to disconnect power to the pump during servicing. In addition, the stand alone siphon port 7 is formed on the manifold. With this arrangement, the siphon line need not be disconnected when servicing the pump.

Figure 3:
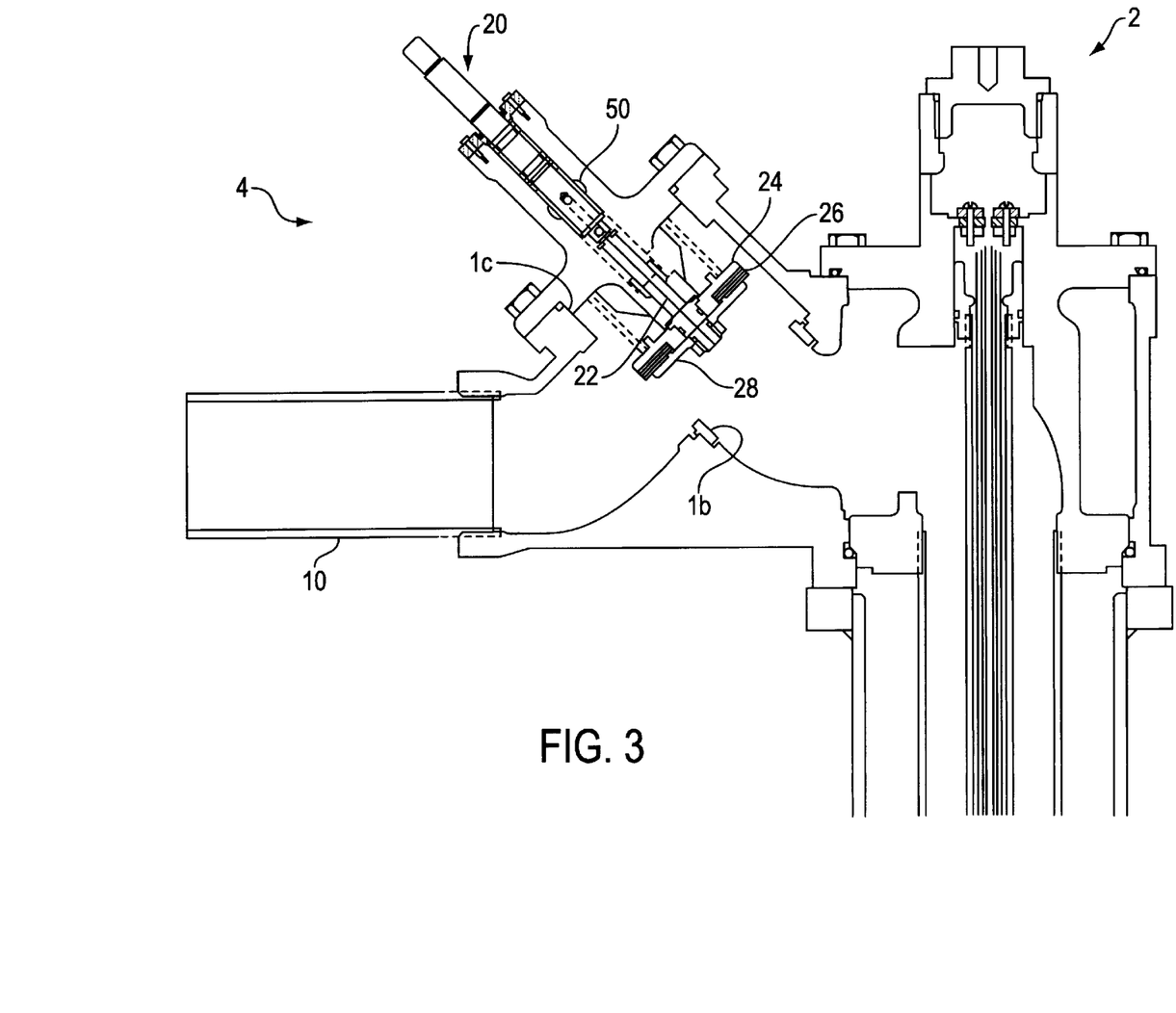
FIG. 3 is an enlarged view of the manifold of FIG. 2, and focusing on the check valve assembly with the lockdown member being shown in the open position.

FIGS. 3–6 show an enlarged view of the check valve assembly 4. In FIG. 3, a check valve member is in the open position, as if the pumped product is flowing. The check valve assembly 4 includes a lockdown member 20 having one end operative to engage a check valve guide 22. The other end of the lockdown member 20 is manipulated by an operator to effect closure of the check valve assembly 4 during a pressure testing procedure to test for leaks, as described in further detail below.

Figure 6:
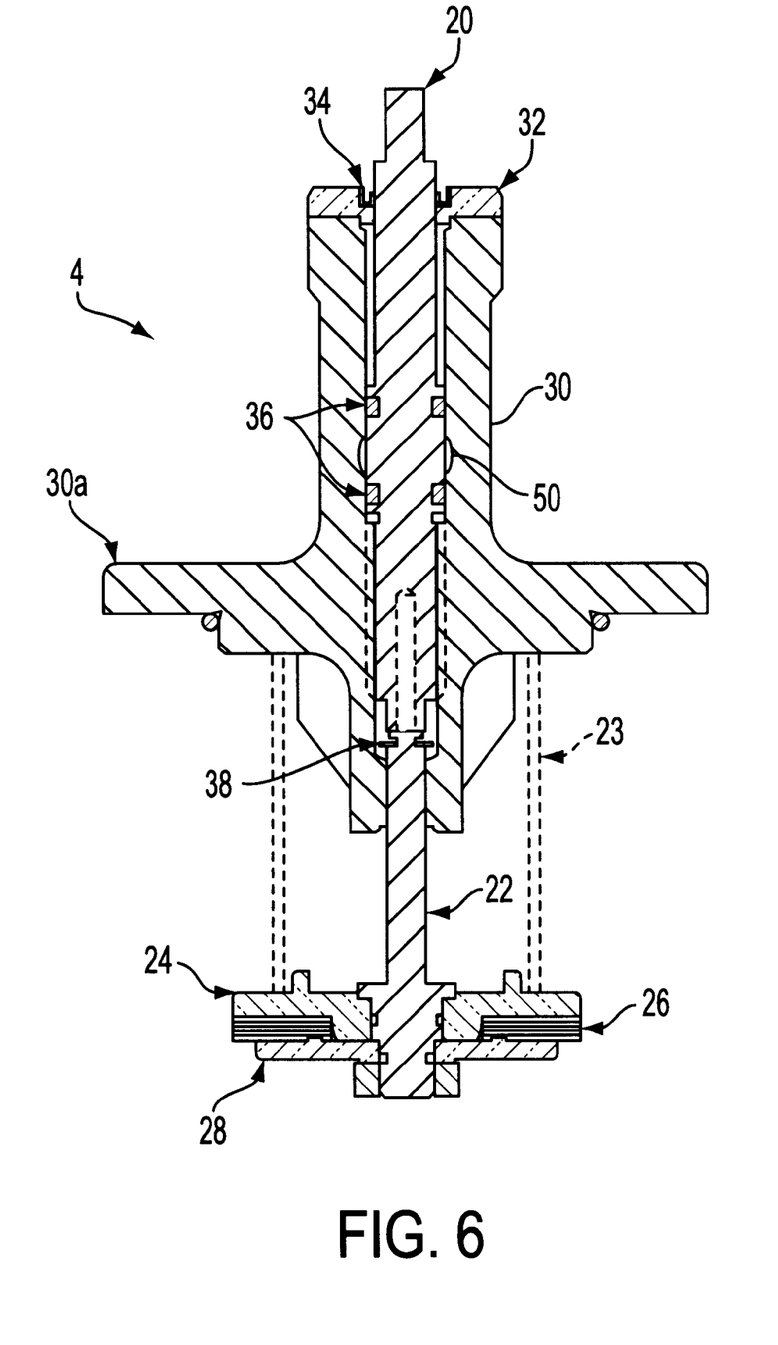
FIG. 6 is a sectional view along the line I—I of FIG. 5A of the check valve assembly.

The check valve guide 22 has one end portion fitted to a check valve plunger 24. The check valve plunger 24 has a check valve seal 26 fitted on one side of the plunger 24 to effect a seal with an opening 1b of the pump manifold 2. A check valve retainer 28 is fixed to one side of the check valve seal 26, so that the seal 26 is fitted between the plunger 24 and the retainer 28, as shown in FIGS. 3 and 6.

Figure 4:
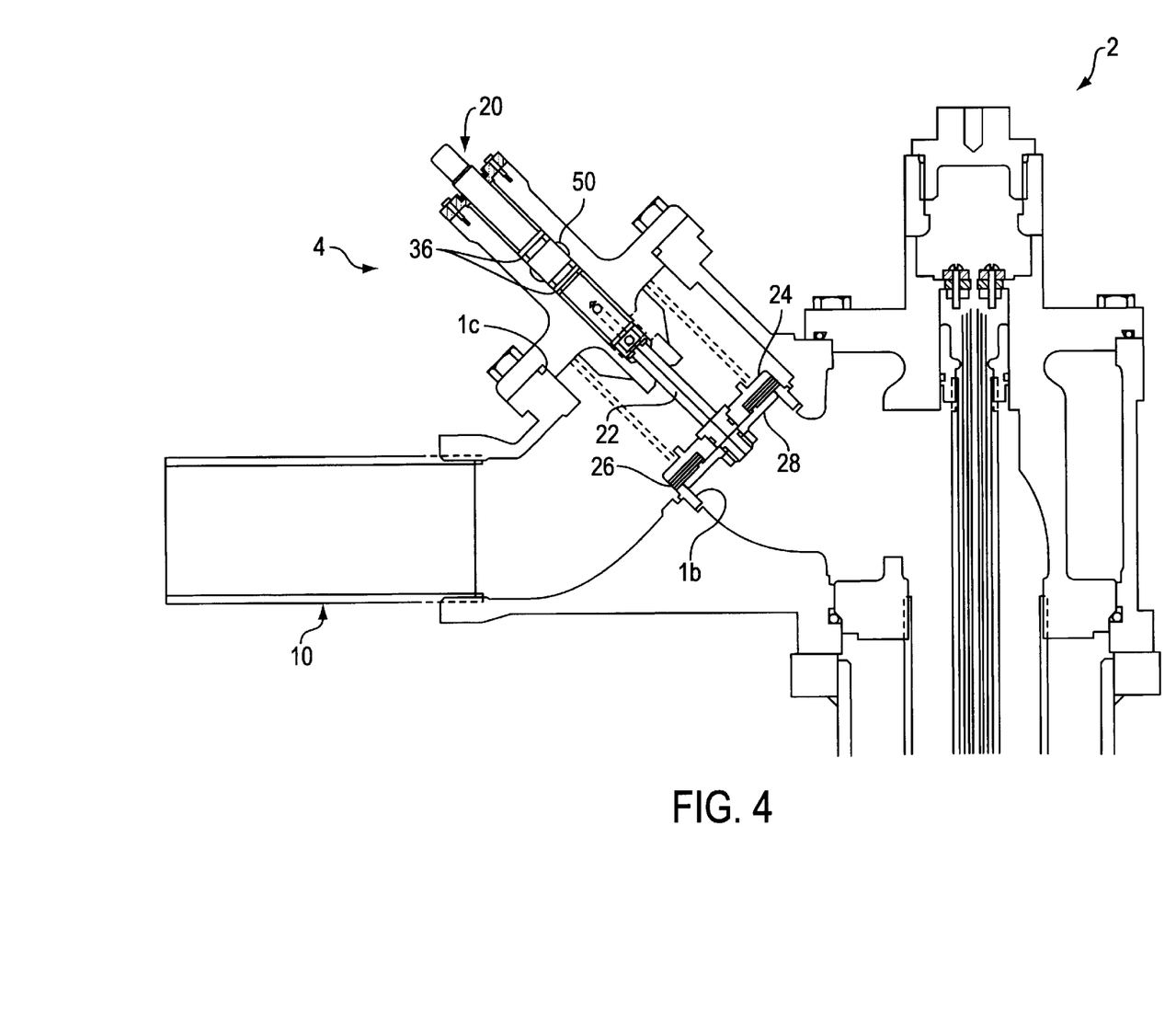
FIG. 4 is a sectional view similar to FIG. 3 except showing the lockdown member in a closed position.

FIG. 4 illustrates the check valve assembly 4 when the check valve member is in a closed position. In this position, the lockdown member 20 is fully screwed down and engaged so that the check valve seal 26 is fitted against the opening 1b. When the lockdown member 20 is fully engaged as shown in FIG. 4, two O-rings 36 seal and close an expansion relief port 50 of the pressure relief valve assembly 6. The expansion relief port 50 connects the check valve assembly 4 to the pressure relief valve assembly 6, as more clearly shown in FIG. 7A.

During normal operation, the lockdown member 20 is in an unscrewed, upper position so that the check valve seal 26 is allowed to move freely, being biased by a check valve spring 23 and guided by the check valve guide 22. As fuel is pumped into the header, the valve opens against the bias of check valve spring 23 to let the fuel flow through and into the dispensing line 10. In the same manner, the valve closes due to the bias of the check valve spring 23 when no fuel is being pumped through to the dispensing line 10. When the lockdown member 20 is fully screwed down during the pressure testing procedure, the check valve seal 26 is forced into the closed position since the guide 22, and lockdown member 20 are set in the most downward position. In this case, no fuel can flow through the header into the dispensing line 10. In addition, when the lockdown member 20 is screwed down, the two O-rings 36 align with either side of the expansion relief port 50, thereby sealing off the port 50 so that fuel can not flow into the pressure relief valve housing 6.

Thus, the check valve assembly 4 serves two functions. First, it assures a complete seal of the dispensing line 10 at the check valve, so that maintenance line checks can be conducted to check for leaks along the dispensing line 10. Second, it closes off the pressure relief valve assembly 6 at the expansion relief port 50. It is important to close off the pressure relief valve during leak checks because the pressure relief valve assembly 6 serves as a bypass back to an underground fuel holding tank. The structure of the check valve assembly 4 is more fully described below.

The check valve assembly 4 has a housing 30 which is fixed to the manifold 2 so that an expansion seat assembly 30a is fitted into an opening 1c of the manifold 2. A wiper seal housing 32 is fixed to the opposite end of the housing where the lockdown member 20 protrudes from the housing 30. A radial wiper seal 34 is fitted within the wiper seal housing 32 as shown in FIG. 6.

In addition, an external retaining ring 38 is fitted around the end of the check valve guide 22, at the portion which meets with the lockdown member 20. The external retaining ring 38, e.g. an E-ring, serves to retain the check valve guide 22 in the housing 30, so that the check valve spring 23 can not bias the guide 22 out of the housing as the lockdown member 20 is rotated or during housing installation when the check valve guide 22 and the plunger 24 are not being biased upward by the opening 1b. The check valve guide 22 which is located axially below the lockdown member 20 within the housing 30, moves with respect to the opening 1b so that the check valve plunger 24 and seal 26 open or close the opening 1b. The check valve spring 23 abuts on either end to the check valve plunger 24 and the housing 30, respectively, to cause the plunger 24 and seal 26 to be biased away from the housing 30. This ensures a proper seal against the opening 1b.

Figure 7A:
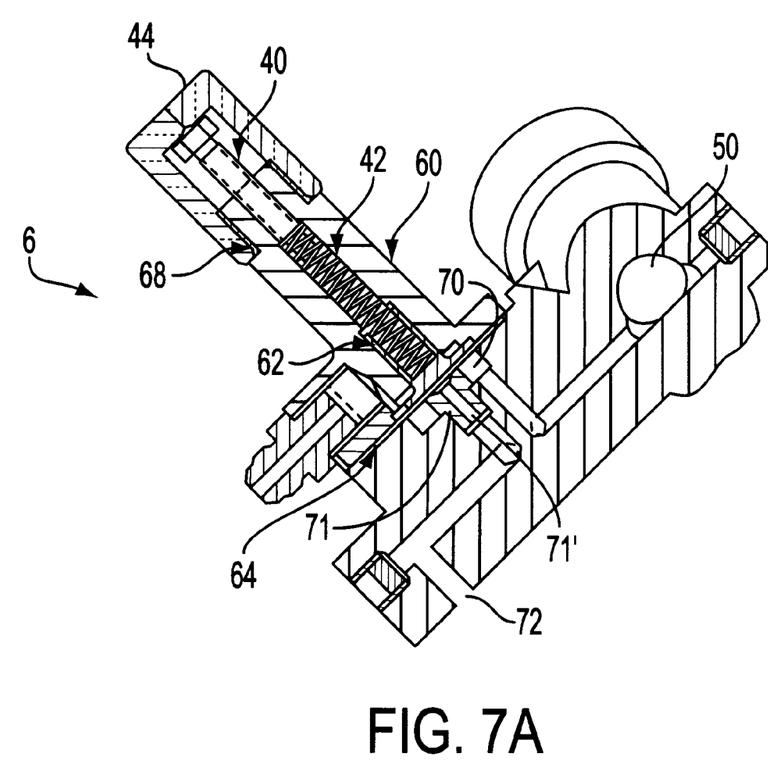
FIG. 7A is a sectional view along the line II—II of FIG. 5A of the pressure relief valve lockdown member.
Figure 7B:
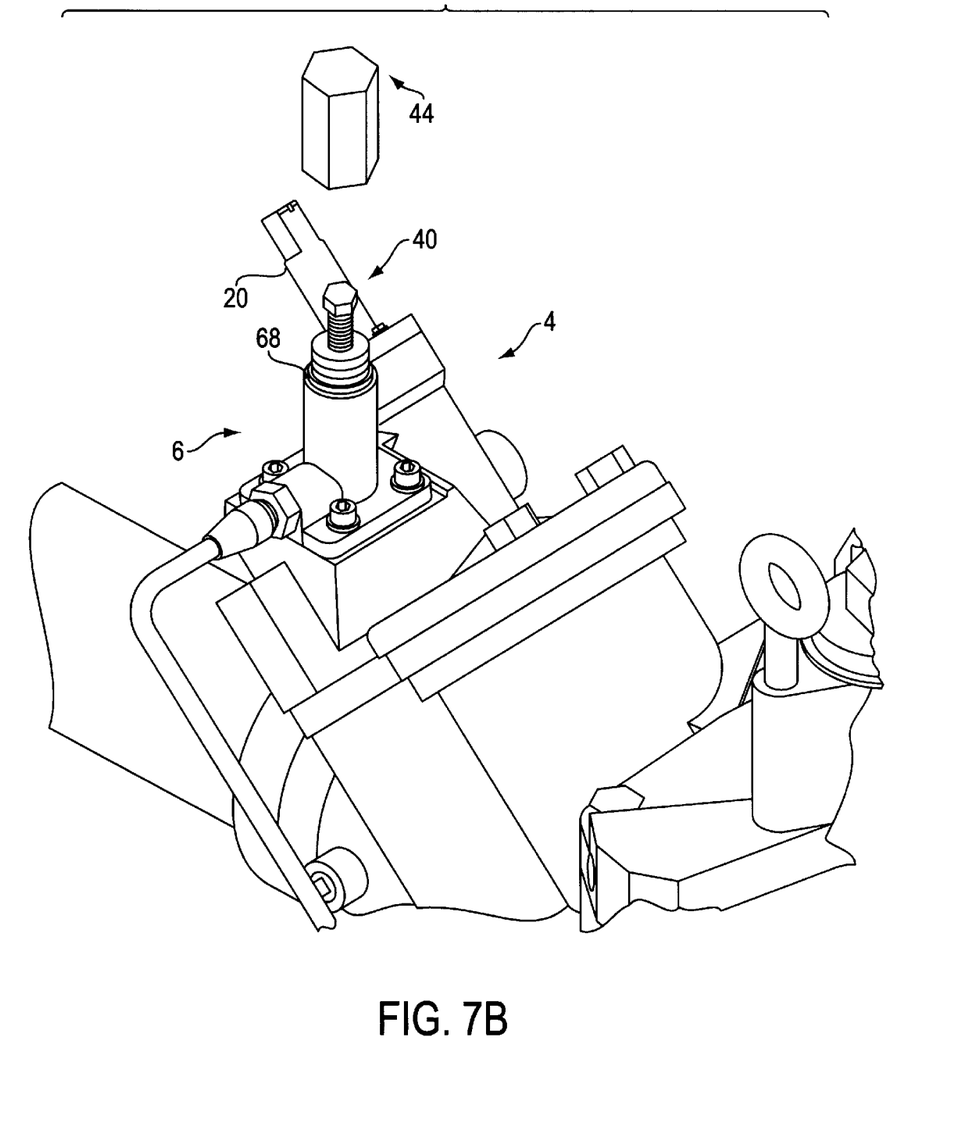
FIG. 7B illustrates the pressure relief valve lockdown member with the protective cover removed.

With respect to the pressure relief valve housing 6, this feature is most clearly shown in FIGS. 7A and 7B. An adjustment member 40, preferably but not necessarily a hexhead bolt or screw, adjusts the force of an expansion relief spring 42 biasing an expansion relief diaphragm 64 as explained below.

One end of the adjustment member 40 abuts against the expansion relief spring 42, both being housed in an expansion relief body 60. One end of the spring 42 is biased against an expansion relief plunger 62 so that the expansion relief diaphragm 64 is biased by the force of the spring 42 as the spring is adjusted by the adjustment member 40 being turned by an operator. A protective cap 44 is fitted at one end of the expansion relief body 60 so as to cover the second end of the adjustment member 40.

An O-ring 68 is fitted between the protective cap 44 and the body 60, to provide a tight seal between the cap 44 and the body 60. As the adjustment member 40 is turned, the force of the spring 42 is adjusted (compressed or decompressed) to change the biasing force against the plunger 62, and the plunger 62 is in turn pressed against the diaphragm 64. FIG. 7A shows the diaphragm in a closed position. The adjustment member 40 is turned one way so as to increase the force of the spring 42 acting against the plunger 62 and the diaphragm 64 thereby increasing the line relief pressure, or turned in the opposite direction to decrease the force of the spring 42 acting against the plunger 62 and the diaphragm 64, thereby decreasing the line relief pressure. In this way, the line relief pressure can be adjustably set between approximately 0 to 50 psi.

During normal operation, the pressure relief valve is set at a desired setting, e.g. 23–28 psi. At this setting, extra fuel flows through the check valve assembly into the expansion relief port 50, and into pressure relief valve housing 6. If the pressure of the fuel exceeds the setting of the pressure relief valve, the diaphragm 64 floats upward away from a seat 71 to allow the fuel to flow up from an annular area 70 and down through a passage 71' in the seat 71, and out a port 72 into a chamber port in the manifold (not shown) which leads back to the fuel holding tank (not shown). In other words, the extra fuel is bypassed back to the fuel holding tank.

Thus, in order to relieve pressure in the pumping assembly, the pumped product flows from the check valve assembly 4, through the expansion relief port 50 into the pressure relief valve assembly 6 and exits through the port 72 leading back into the holding tank.

Figure 5A:
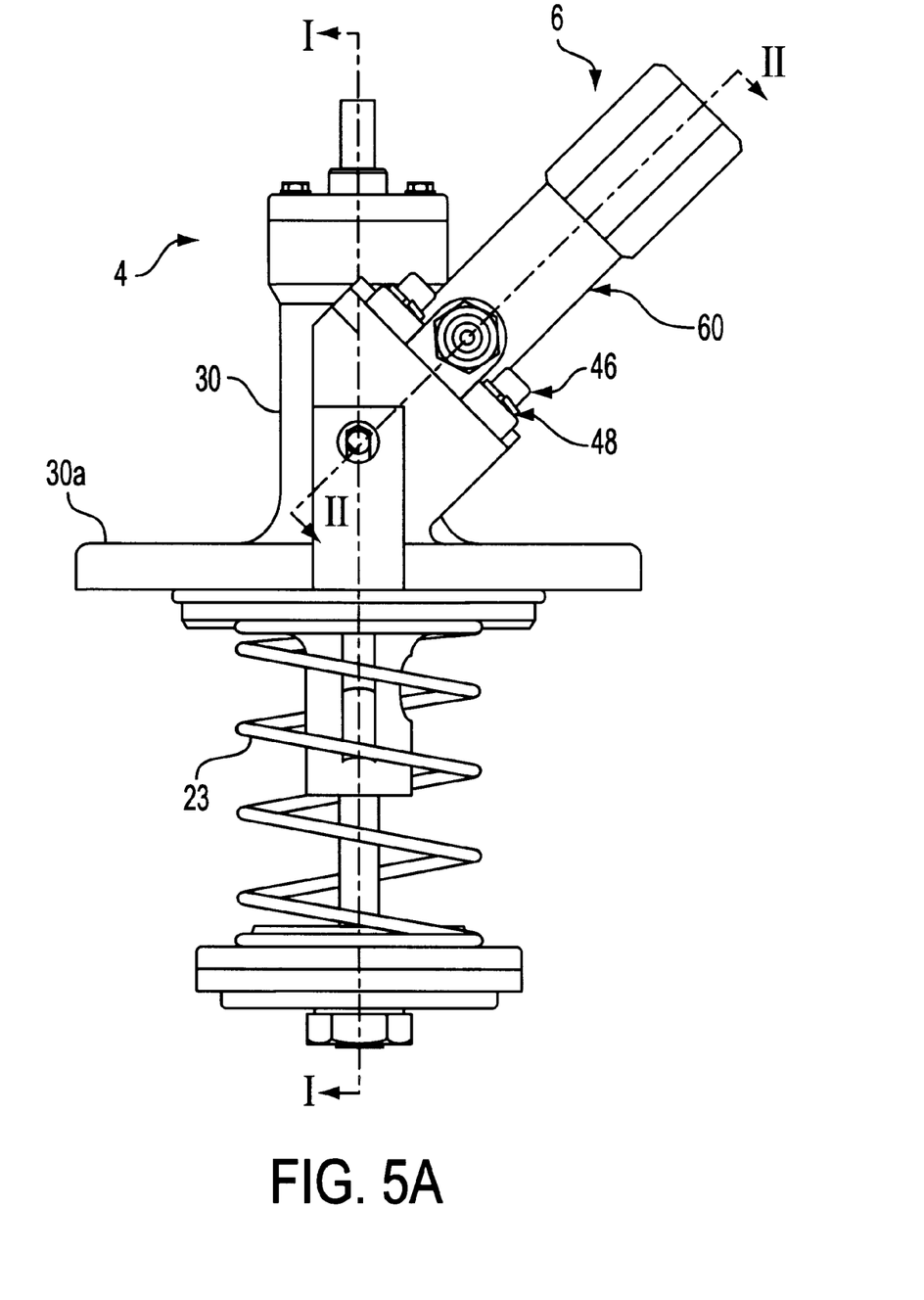
FIG. 5A is another enlarged view of the housing unit of FIG. 2, from another angle which shows the check valve and pressure relief valve assemblies.

Furthermore, the expansion relief body 60 is attached to the housing 30 by screws 46 and spring lockwashers 48 as shown in FIG. 5a. Thus, the check valve assembly 4 and pressure relief valve assembly 6 are located adjacent to one another on a single body to allow easy adjustments for operating the pumping assembly and for performing line maintenance tests.

A method of assembling the housing unit 3 onto the manifold 2 will now be described.

Figure 5B:
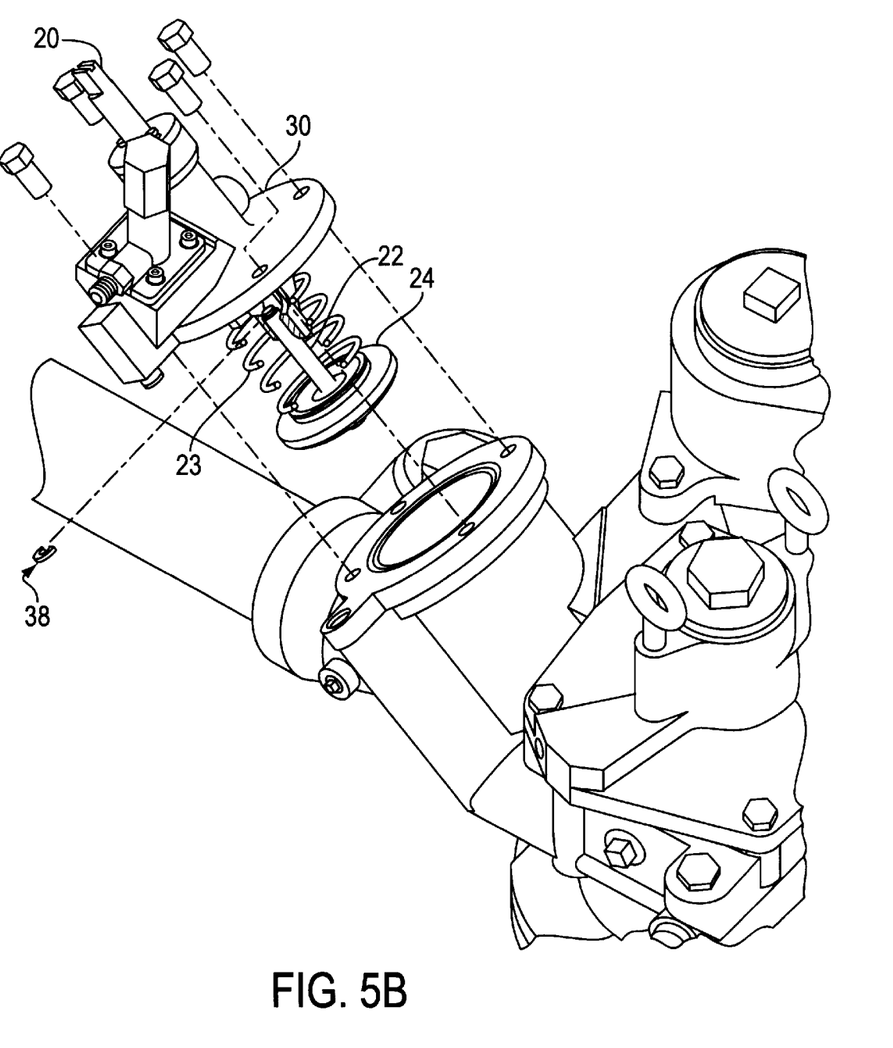
FIG. 5B is an exploded view of the check valve assembly disassembled from the manifold.
Figure 8:
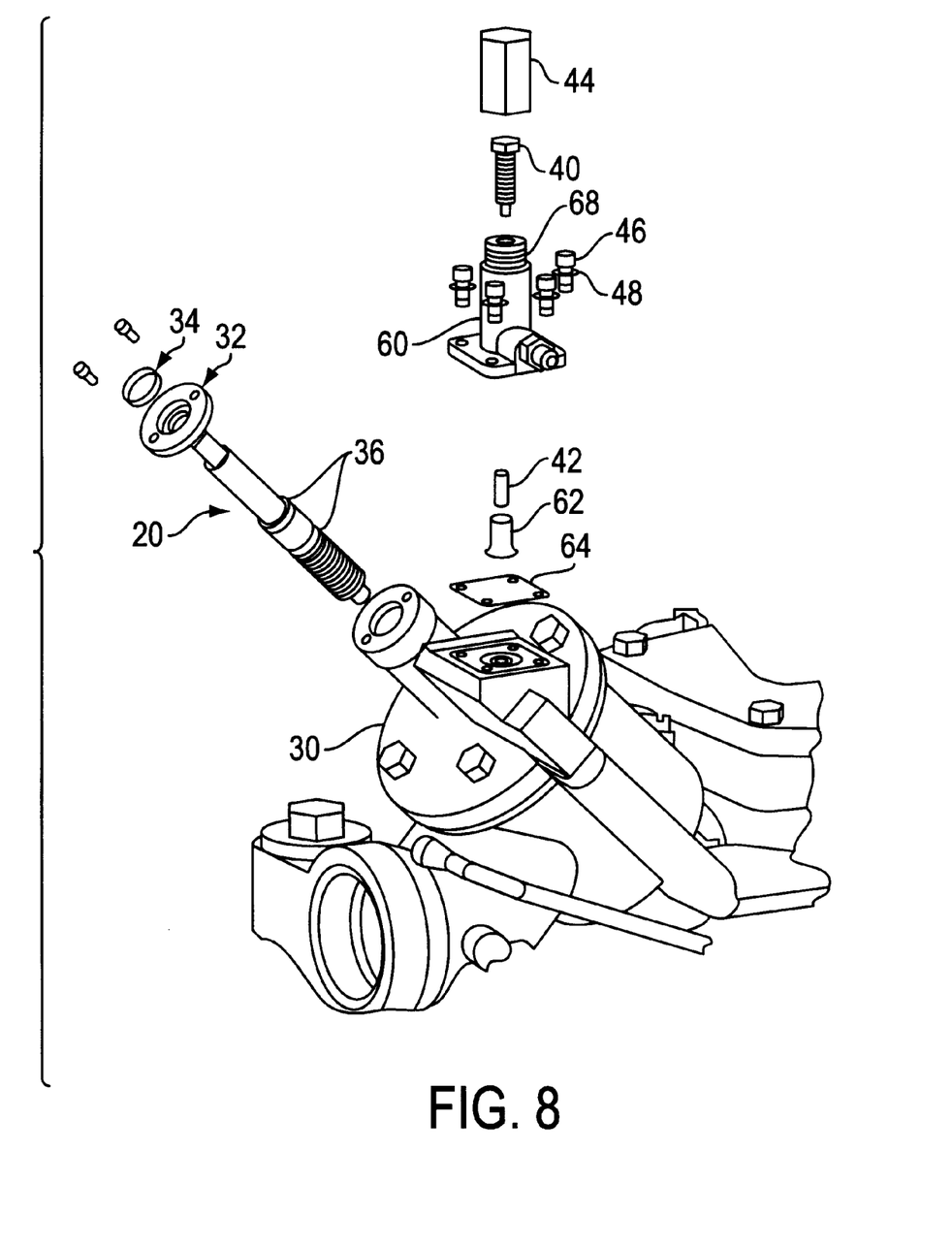
FIG. 8 illustrates a portion of the housing unit disassembled from the manifold.

The housing unit 3 is assembled onto the manifold 2, as best illustrated in FIGS. 5B and 8. First, the check valve guide 22, being attached to the check valve plunger 24 and check valve seal 26, is fitted through the check valve spring 23 so as to be inserted within the housing 30. The spring is compressed slightly and the external retaining ring 38 is then inserted into a groove of the check valve guide 22, so that the check valve guide is retained in the housing 30. The check valve assembly 4 is then lowered into the manifold. Thereafter, the housing unit 3 is fastened to the manifold 2 by bolts, or the like.

When disassembling the housing unit 3 from the manifold 2, the housing unit is pulled straight out of the manifold. The check valve guide 22 and associated check valve plunger 24 and seal 26, are removed from the check valve assembly 4 by compressing the check valve plunger 24 towards the housing 30 so that the spring 23 is compressed. This provides for the removal of the retaining ring 38 from the check valve guide 22. Thus, the check valve guide 22 can be removed from the housing 30.

The check valve lockdown member 20 can be assembled onto the check valve housing 30 as follows. First, the O-rings 36 are fitted onto the lockdown member 20 as shown in FIG. 8. The O-rings should be installed from the non-threaded end of the lockdown member 20 to avoid damaging the O-rings 36. The O-rings 36 should be sparingly lubricated before the lockdown member 20 is fitted into the housing 30. The wiper seal housing 32 is then fitted over the lockdown member 20 and onto the housing 30. Again, the radial wiper seal 34 should be lubricated before sliding over the lockdown member 20, so as to avoid damaging the seal 34.

It will be apparent to those skilled in the art that various modifications and variations can be made in the manifold unit according to the present invention without departing from the spirit or scope of the invention. Thus, it is intended that the present invention cover the modifications and variations of the invention provided they come within the scope of the appended claims and their equivalents.

What is claimed is:

1. A housing unit for use with a manifold mounted at an outlet end of a submersible pump, said housing unit comprising:

a check valve assembly having a check valve housing mounted on the manifold and having a check valve member disposed therein;

a lockdown member disposed in said check valve assembly and being operative to engage with and close said check valve member during a testing procedure; and a pressure relief valve assembly mounted on said check valve housing, for adjusting a relief pressure to a desired setting, so that said check valve assembly and said pressure relief valve assembly are proximate each other, wherein said pressure relief valve assembly comprises an expansion relief body mounted on said check valve housing, and an adjustment member which protrudes from one end of said expansion relief body, wherein said adjustment member adjusts the relief pressure independently of said lockdown member.

2. The housing unit according to claim 1, wherein said check valve assembly includes an expansion relief port for allowing fuel to flow from said check valve assembly into said pressure relief valve assembly.

3. The housing unit according to claim 2, wherein said check valve assembly seals off said expansion relief port during a testing procedure by a movement of the lockdown member.

4. The housing unit according to claim 3, wherein said check valve assembly seals off a fuel dispensing line and said expansion relief port simultaneously during a testing procedure by a movement of the lockdown member.

5. The housing unit according to claim 4, wherein said check valve member includes a check valve seal, and said lockdown member is operative to move axially within said check valve housing when turned, which causes said check valve seal to seal the outlet end of the submersible pump from said dispensing line during a pressure testing procedure.

6. The housing unit according to claim 1, wherein said check valve housing is mounted on the manifold so as to be positioned at a 45 degree angle from a mounting plane on which the manifold is mounted on the submersible pump for allowing optimum laminar flow of a pumped product.

7. The manifold assembly according to claim 5, wherein said check valve housing includes an expansion seat assembly which fits over a first opening of the manifold, so that said housing unit is positioned at a 45 degree angle from a mounting plane on which the manifold is mounted on the outlet end of the submersible pump.

8. The housing unit according to claim 7, wherein said check valve member further comprises a check valve guide, a check valve plunger and a check valve spring for urging said check valve seal against a second opening of the manifold, said second opening being located adjacent the outlet of the submersible pump, wherein said check valve guide, check valve plunger and said check valve spring cooperate with said lockdown member to cause said check valve seal to seal off said second opening during a pressure testing procedure.

9. The housing unit according to claim 3, wherein said check valve assembly seals off said expansion relief port with a pair of O-rings which are fitted to the outside of said lockdown member, so that said pair of O-rings isolate said expansion relief port from a dispensing line.

10. The housing unit according to claim 1, wherein said pressure relief valve assembly further comprises a protective cap fitted to one end of said adjustment member with an O-ring disposed between said protective cap and said expansion relief body.

11. The housing unit according to claim 1, wherein said expansion relief body houses an expansion relief spring, and expansion relief plunger and a diaphragm, said adjustment member urging said expansion relief spring against said expansion relief plunger so as to move said expansion relief plunger with respect to a fixed seal face of the check valve housing, thereby adjusting said diaphragm located between said expansion relief plunger and said fixed seal face in order to adjust the relief pressure of the pressure relief valve assembly, wherein said adjustment member is turned to bias said expansion relief spring when the desired setting of the relief pressure is changed.

12. The housing unit according to claim 11, wherein said pressure relief valve assembly further comprises a protective cap fitted over said adjustment member, and an O-ring fitted between said protective cap and said pressure relief body for ensuring a tight fit of said protective cap onto said expansion relief body.

13. A method for assembling a housing unit having a check valve assembly and a pressure relief valve assembly therein, onto a manifold, comprising the steps of:

inserting a check valve guide through a check valve spring, wherein the check valve guide is attached to a check valve plunger;

compressing the check valve spring;

inserting the check valve guide into a housing of the check valve assembly;

placing an external retaining ring on the check valve guide so as to retain the check valve guide in the housing of the check valve assembly;

releasing the compression of the check valve spring; and     detachably attaching the housing unit to the manifold.

14. The method of assembling a housing unit according to claim 13, further comprising a method of fitting a lockdown member into the check valve assembly, comprising the steps of:

fitting a pair of O-rings over a lockdown member of the check valve assembly;

inserting the lockdown member into the housing of the check valve assembly;

fitting a radial wiper seal assembly over the lockdown member; and     fixing the radial wiper seal assembly to the housing of the check valve assembly.

* * * * *